May 26, 1970  W. ESPIG  3,513,762
RELEASING DEVICE EQUIPPED WITH AN ELECTRONIC TIMING
MEANS FOR RELEASING A PHOTOGRAPHIC CAMERA
Filed Sept. 15, 1967  2 Sheets-Sheet 2
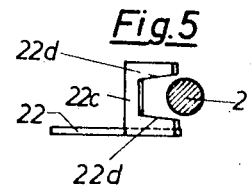
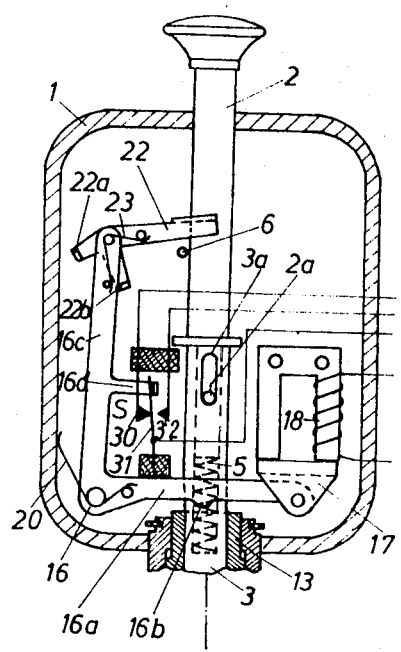
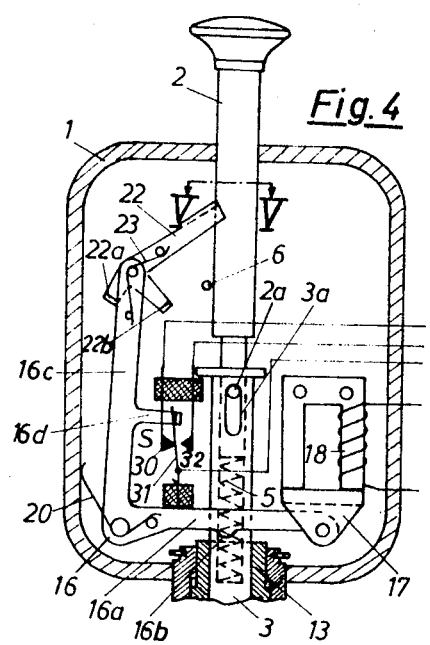
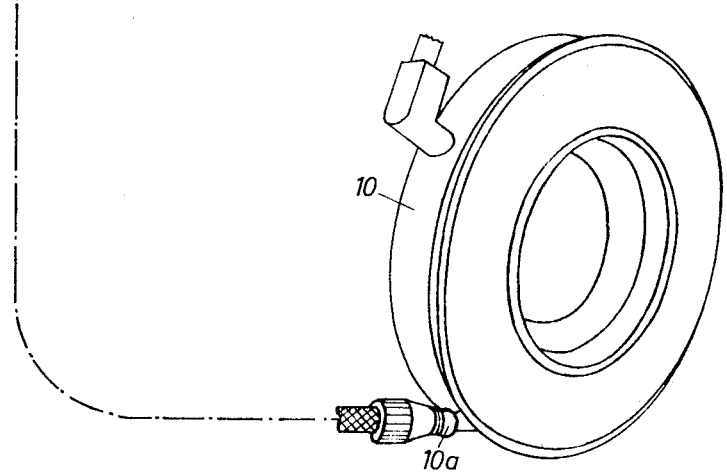
INVENTOR
Winfried Espig
BY Arthur A. March
ATTORNEY United States Patent Office 3,513,762
Patented May 26, 1970

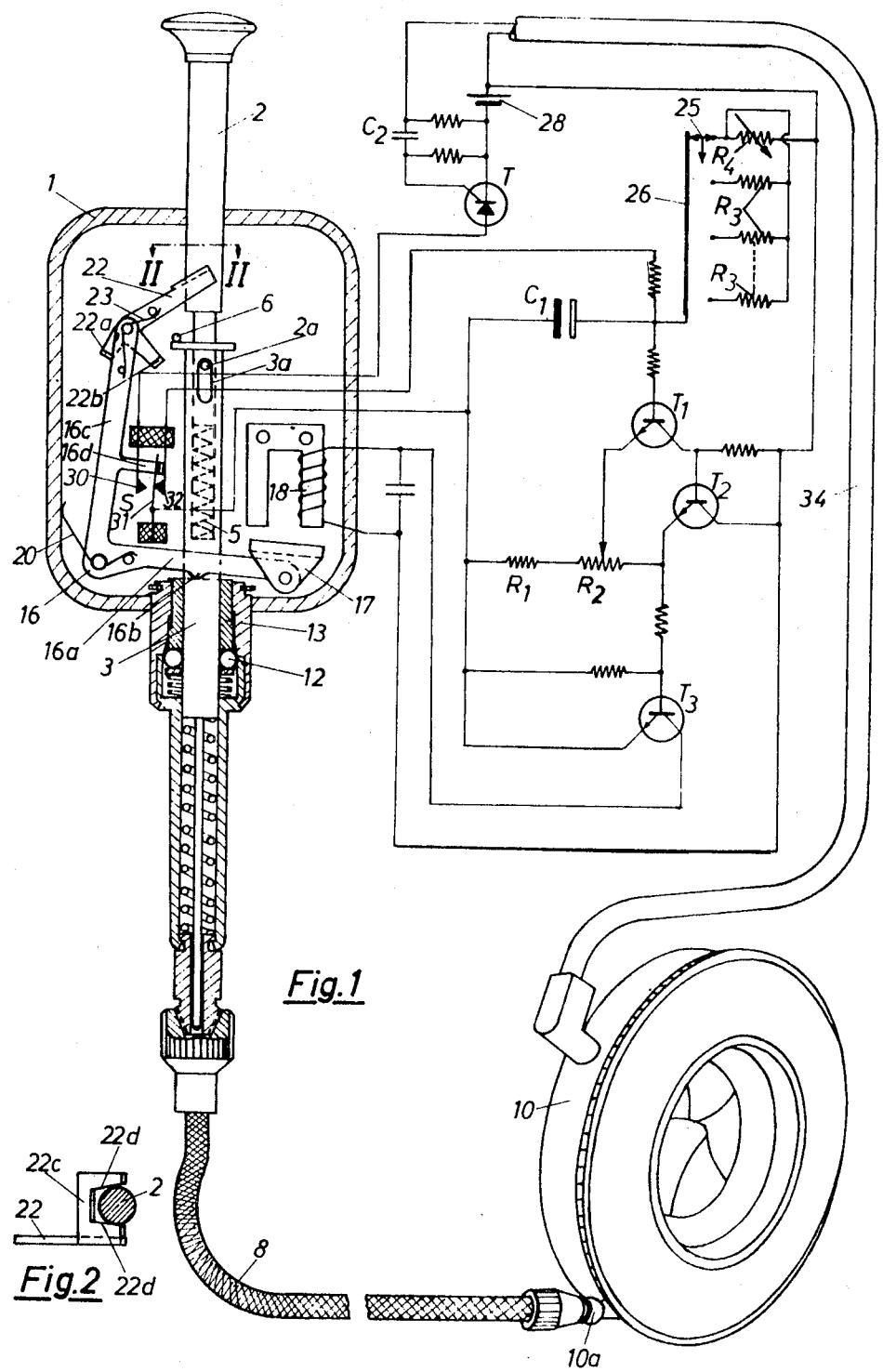

3,513,762
RELEASING DEVICE EQUIPPED WITH AN ELECTRONIC TIMING MEANS FOR RELEASING A PHOTOGRAPHIC CAMERA
Winfried Espig, Calmbach, Black Forest, Germany, assignor to Prontor-Werk Alfred Gauthier G.m.b.H., Calmbach, Black Forest, Germany
Filed Sept. 15, 1967, Ser. No. 668,071
Claims priority, application Germany, Sept. 19, 1966, P 40,414
Int. Cl. G03b 9/64
U.S. Cl. 95—53.3       6 Claims

ABSTRACT OF THE DISCLOSURE

A releasing device for a photographic camera that has adjustable electronic timer for the control of exposure times of different durations in the B setting of the camera. A release tappet is provided to act on the shutter of the camera. The release tappet is connected to the wire release connection of the camera and operates in conjunction with the electronic timer. A feed line is provided between the current source and the individual components of the electronic timer. A thyristor is connected in the feed line to control the flow of current in the feed line. The grid of the thyristor is ignited by a voltage upon the actuation of the flash contact member of the camera.

This invention relates to a device for releasing a photographic camera and, more particularly, to a releasing device having a releasing tappet acting on the shutter of the camera which is connectable to the wire release connection of the camera and is equipped with a settable electronic timing means for the control of exposure times of different duration in the B setting of the camera.

In a known releasing device of this kind, the electronic timing means has, as a time-regulating member, a resistance-capacitance member which upon actuation of the releasing tappet is applied to a voltage by means of a special switch. To be able to use the device universally in cameras, that is, in all cameras regardless of the magnitude of the stroke, measures are taken which permit an adaptation of the releasing mechanism of the device to the stroke of the particular camera such that the actuation of the aforesaid switch coincides in time with the shutter release, and this can be controlled by a special control means arranged in the releasing device.

To simplify the handling of such a releasing device it has been proposed previously to actuate the switch initiating the charging of the condenser of the time-regulating member by a relay which is connectable through a connecting cable to the flash contact of the camera to be released. The advantage of a releasing device equipped with a relay resides in the fact that for the exact maintenance of the set exposure time it need not be adapted to the specific releasing stroke of the particular camera to be released.

It is the object of the present invention to further improve the above kind of releasing devices in the sense that the same advantageous mode of operation typical of the above-mentioned arrangement is obtained with fewer components and hence with a simpler construction of the device.

It is another object of this invention to increase the reliability of operation of such a releasing device.

It has now been found that the foregoing objects and other advantages can be readily attained in a releasing device according to the invention in that there is arranged in the feed line, between the current source and the individual components of the electronic timing means, a thyristor having a grid to which an igniting potential can be applied by means of the flash contact of the camera. In this way it is now possible to achieve a structural simplication of the releasing device insofar as the arrangement of a thyristor permits dispensing with a relay serving to control the time-regulating member of the electronic circuit as well as a switch actuated by it while retaining the other structural conditions. Besides, the use of a thyristor, which is functionally equivalent to a so-called "current gate," renders the equipment entirely independent of the contact characteristic and also of the contact quality as far as reliability of operation is concerned. Neither contact chatter nor too short an application of the flash contact can adversely affect the operation of the electronic timing means or interrupt their functional sequence. Once the thyristor is ignited, that is, once the "current gate" is open, it can change to the closed position again only when the switch actuated by the releasing tappet is again actuated.

According to a further advantageous embodiment of the invention, a switch is provided which upon movement of the releasing tappet, before the release of the shutter, establishes the connection between the thyristor and the electronic timing means and breaks it again upon return of the tappet to the starting position. This measure insures that the electronic timing means is necessarily separated from the current source at the end of the exposure time as a function of the relief of the releasing tappet, so that in the neutral position of the releasing tappet no current flows from the battery. This results in a galvanic separation of the thyristor and the electronic circuit, whereby ultimately the flow of residual currents in the semiconductor components is avoided also.

To limit to a minimum the cost of construction for the switch arrangement of the releasing device, this invention further provides for the design of the above-mentioned switch as a change-over switch, one contact point of which serves to short-circuit the charging condenser of the electronic timing means.

Other objects and advantages will be readily apparent from the following detailed description and the attached drawings wherein:

FIG. 1 is a cross-sectional view of the releasing device of this invention illustrated in connection with the schematic representation of an electronic timing means controlled by a thyristor, the device being attached to the wire release connection as well as connected to the flash contact connecting nipple of the shutter of a camera not shown in detail; the releasing device and shutter being illustrated in the starting position;

FIG. 2 is a partial transverse sectional view through the device along line II—II of FIG. 1;

FIG. 3 is a partial view similar to FIG. 1 illustrating the parts after actuation of the releasing tappet and with the shutter open;

FIG. 4 is a partial view similar to FIG. 1 illustrating the releasing device with the upper part of the tappet released;

FIG. 5 is a partial transverse sectional view along line V—V of FIG. 4.

Referring now to the drawings, there is illustrated a housing, designated by the reference numeral 1, of a releasing device attachable to a camera of the type having a wire release connection, by means of which exposure times of relatively long duration are obtainable in the B setting of the camera. In the housing 1, a two-part releasing tappet 2, 3 is displaceably guided, the two telescoping parts of which are biased away from each other by a compression spring 5. Both tappet parts are limited in relation to their axial mobility by a pin and slot connection 2a, 3a. In the starting position as per FIG. 1, the lower part 3 of the tappet abuts against a fixed pin 6. The releasing device can be attached to the wire release connection 10a of a photographic camera, not shown in detail, either directly or with the aid of a flexible wire release adapter 8. For reasons explained in detail below, the above-mentioned releasing device can be used exclusively with a shutter 10 which is provided with a synchronous contact known in itself and therefore, not shown in detail for the taking of flash pictures, as well as with a flash contact connecting nipple. Both the synchronous contact and the wire release connection 10a can be arranged, at variance from the representation in FIG. 1, in a known manner at the camera housing.

As is further evident from FIG. 1, there is provided, for the retention of the lower part 3 of the tappet in the release position as illustrated in FIGS. 3 and 4, a ball lock 12 which permits a depression of the releasing tappet 2, 3, but prevents the return of the lower part 3 until a pressure canceling the locking effect is exerted on the unlocking sleeve 13. To open the ball lock 12 there is provided a fixedly mounted angle lever 16 which cooperates at one end with the upper part 2 of the tappet, and at the other end with the circuit of an electronic timing means described in detail below. For this purpose on the arm 16a of the angle lever 16 there is articulated a magnet armature 17 which cooperates with a holding magnet 18. The lever arm 16a is provided with a nose 16b which, by means of a return spring 20, exerts a certain pressure on the unlocking sleeve 13 when the magnet 18 releases the armature 17. On the other arm 16c of the angle lever 16 a pawl 22, loaded by a spring 23, is rotatably mounted and provided with two limit stops 22a and 22b. Further, the pawl 22 carries at its free end a coupling jaw 22c having flanks 22d that abut in the starting position against the shell of the upper tappet part 2, as illustrated in FIG. 2.

The electronic timing means may be designed as a flip-flop circuit and for this purpose be provided with two emitter-coupled transistors $T_1$ and $T_2$. The latter transistor $T_2$ is associated with a switching transistor $T_3$ connected in series with the electromagnet 18. To fix the threshold value of the electronic flip-flop circuit, a fixed resistance $R_1$ and an adjustable resistance $R_2$ may be provided. In an additional loop of this switching device there may be arranged a condenser $C_1$ connected with the transistor $T_1$, and further, a number of time regulating resistances which in connection with the condenser, are provided to control the present exposure time. These resistances may, with respect to their resistance value, comprise preferably uniformly graded time-regulating resistances $R_3$, each of which possesses an ohmic value corresponding to a certain exposure time. The time-regulating resistances $R_3$ may, moreover, be preceded by an adjustable resistance $R_4$, by means of which the constant stage jumps between the resistance values of the time-regulating resistances can be bridged steplessly so that ultimately the entire time range of the releasing device is continuously variable. For feeding the particular resistance value into the electronic circuit, the embodiment shown provides a contact bridge 25, which is slidingly guided on a contact track 26 and can be brought into contact position with the resistance $R_4$ or one of the resistances $R_3$ by means of an exposure time setter not shown in the drawing. The setting of the continuously variable resistance $R_4$ also can be effected with the exposure time setter.

Since in the above described releasing device with an electronic time control, a decisive factor from the viewpoint of operation is that the timing means is set in motion exactly when the shutter clears the lens aperture. In order for the timing of the two criteria to be independent of the magnitude of the releasing stroke of the camera, there is advantageously provided according to this invention a thyristor T which lies in a connecting line leading from the negative pole of a current source 28 to the electronic switching means and which can be ignited by the flash contact of the camera to be released.

The arrangement may further be such that the thyristor T is connected by its cathode to the negative pole of the current source 28, while being connected by the anode to a contact 30 of a reversing switch S. The switch S is provided for short-circuiting the condenser $C_1$ in the starting position of the releasing device, for which purpose the contact spring 31, movable by means of a hook-shaped finger 16d of the angle lever 16, is designed as a resilient tongue so that it is biased against the contact 32 in the starting position of the releasing device.

The grid of the thyristor T is connected through a current carrying cable 34 with the flash contact on the camera side, which synchronously with the clearing of the lens aperture through the shutter brings about an electrical connection of the grid with the positive pole of the current source 28. The grid circuit of the thyristor T also contains a condenser $C_2$, which by a connection through the flash contact produces a current pulse on the grid, resulting in the ignition of the thyristor T. When the condenser $C_2$ is charged, the grid potential of thyristor T again becomes negative. The thyristor still remains ignited and the electronic timing means energized until the threshold value of the flip-flop circuit is reached. When this occurs, the thyristor is blocked, so that after the expiration of the exposure time, the electronic timing means is separated from the current source 28 not only by means of the switch S as a function of the relief of the releasing tappets 2 and 3, but also electrically. As shown both sides of condenser $C_2$ are still connected through a resistance for each to the negative pole of the current source 28.

The handling and operation of the above described releasing device is as follows:

For the purpose of taking picture with ultra-long exposure time, after the camera has been set on B, the releasing device is attached on the wire release and the current carrying cable 34 is plugged on the flash contact connecting nipple, as shown in FIG. 1. Upon depression of the upper part 2 of the tappet, the pawl 22 is rotated clockwise due to the friction grip between it and the upper part of the tappet, until ultimately the flap 22b abuts against the arm 16c of the angle lever 16. At this point the angle lever 16 executes a rotational movement in a counterclockwise direction, with the result that the armature 17 is positioned against the electromagnet 18 and the contact spring 31 is positioned against the contact 30. Thus, there is provided an electrical connection between the electronic timing means and the anode of the thyristor T, but current does not yet flow through the circuit because the thyristor is still blocked.

Because of the frictional grip of the pawl 22, the tappet parts 2 and 3 continue to move downward until at last the release of the shutter takes place. When the shutter blades have reached the open position, voltage is applied to the condenser $C_2$ by actuation of the flash contact, so that the thyristor T is ignited and the electronic timing means is electrically connected through the thyristor with the negative pole of the current source 28. Accordingly, the two transistors $T_2$ and $T_3$ are rendered conductive, while the transistor $T_1$ remains blocked. Meanwhile the electromagnet 18 is loaded with current, thereby holding the angle lever 16 in the position shown in FIG. 3. Simultaneously with the above described processes, the condenser $C_1$, determining the exposure time, begins to charge. When the upper part 2 of the tappet is released, it changes over under the influence of the compression spring 5 into the relative position according to FIG. 4 where it is limited in movement by the pin and slot connections 2a and 3a. At this point the pawl 22 occupies the position shown in FIG. 5 in relation to the upper tappet part 2. The lower tappet part 3, on the contrary, is retained in the release position by the ball lock 12.

After expiration of the preset exposure time, i.e. when condenser $C_1$ has become charged to the threshold value of the electronic flip-flop circuit, the transistor $T_1$ responds, whereby the two transistors $T_2$ and $T_3$ suddenly block, so that the electromagnet 18 becomes deenergized. The result of this is that the holding current of the thyristor T becomes insufficient so that the thyristor T blocks and thus suppresses the flow of current to the electronic timing means independently of the position of the contact spring 31 of the reversing switch S. Due to the collapse of the magnetic field, the return spring 20 is able to move the angle lever 16 back into the starting position, whereby, through the abutment of the nose 16b on the end face of the unblocking sleeve 13, the ball lock 12 is opened, so that the two tappet parts 2 and 3 can return, under the action of the spring 5, into the starting position fixed by pin 6, in which the coupling jaw 22c, applies with its flanks 22d against the upper part of the tappet. With the return of the angle lever 16, the spring tongue 31 of the reversing switch S again abuts against the contact 32, whereupon the condenser $C_1$ discharges. At the same time the electrical connection between the anode of thyristor T and the electronic timing means is interrupted.

It will be understood that the foregoing description with the details of exemplary structure is not to be construed in any way to limit the invention, but that modifications may be made thereto without departing from the scope of the invention as set forth in the following claims.

Having thus described my invention, I claim:

1. A releasing device for a photographic camera comprising: adjustable electronic timing means for the control of exposure times of different duration in the B setting of the camera, a release tappet operable to act on the shutter of the camera, said tappet being connectable to the wire release connection of the camera and operable to cooperate with said electronic timing means, a feed line between a current source and the individual components of said electronic timing means, and a thyristor connected in said feed line to operate as a current gate to control the flow of current in said feed line during the exposure process, said thyristor having a grid with an igniting potential applied by means of the flash contact of the camera.

2. The releasing device of claim 1 having a switch between said thyristor and said electronic timing means, wherein movement of said release tappet before release of the shutter actuates said switch to establish a connection between said thyristor and said electronic timing means and return movement of said tappet to the starting position actuates said switch to brake said connection.

3. The releasing device of claim 2 wherein said switch is a change-over switch, one contact point of which serves to short-circuit the charging condenser of said electronic timing means.

4. A releasing device for a photographic camera comprising: adjustable electronic timing means for the control of exposure times of different duration in the B setting of the camera, release means operable to act on the shutter of the camera, said release means being connectable to the wire release connection of the camera and operable to cooperate with said electronic timing means, electrical circuit means between a current source and said electronic timing means, and a thyristor connected in said electrical circuit means to operate as a current gate to control the flow of current in said feed line during the exposure process, said thyristor having a grid which is ignited by a voltage applied upon the actuation of the flash contact of the camera.

5. The releasing device of claim 4 having switch means between said thyristor and said electronic timing means, movement of said release means before release of the shutter being operable to actuate said switch means to establish a connection between said thyristor and said electronic timing means and return movement of said release means to the starting position being operable to actuate said switch means to break said connection.

6. The releasing device of claim 5 wherein said switch means is a change-over switch, one contact point of said change-over switch serving to short-circuit a charging condenser of said electronic timing means.

References Cited

UNITED STATES PATENTS

| 3,103,618 | 9/1963 | Slater | 307—252 XR |
| 3,357,332 | 12/1967 | Helber | 95—53.3 XR |
| 3,418,910 | 12/1968 | Rentschler | 95—53.3 |

FOREIGN PATENTS

| 1,239,564 | 4/1967 | Germany. |

NORTON ANSHER, Primary Examiner

L. H. McCORMICK, Jr., Assistant Examiner

U.S. Cl. X.R.

307—252